(12) United States Patent
Hiramatsu

(10) Patent No.: US 6,843,604 B2
(45) Date of Patent: Jan. 18, 2005

(54) ULTRATHIN-WALLED ROLLING BEARING

(75) Inventor: Kengo Hiramatsu, Kuwana (JP)

(73) Assignee: NTN Corporation, Osaka-Fu (JP)

( * ) Notice: Subject to any disclaimer, the term of this patent is extended or adjusted under 35 U.S.C. 154(b) by 60 days.

(21) Appl. No.: 10/456,994

(22) Filed: Jun. 6, 2003

(65) Prior Publication Data

US 2003/0235357 A1 Dec. 25, 2003

(30) Foreign Application Priority Data

Jun. 20, 2002 (JP) .......................................... 2002-180166

(51) Int. Cl.[7] .............................................. F16C 33/38
(52) U.S. Cl. ........................ 384/523; 384/450; 384/527
(58) Field of Search ................................ 384/523, 450, 384/526, 572, 527, 532

(56) References Cited

U.S. PATENT DOCUMENTS 6,464,397 B2 * 10/2002 Kobayashi .................. 384/450
2002/0006238 A1 * 1/2002 Kobayashi .................. 384/523

* cited by examiner

*Primary Examiner*—Lenard A Footland
(74) *Attorney, Agent, or Firm*—J.C. Patents

(57) ABSTRACT

The designing of an annular integral type is established by forming a cage of a resin material that satisfies the condition (a) that the ratio of its linear expansion coefficient to that of bearing steel is not more than 2 or the condition (b) that its water absorption percentage is not more than 0.5%, or both conditions (a) and (b), thereby preventing the occurrence of abnormal sounds by stabilizing the behavior of a segment type cage for an ultrathin-walled rolling bearing.

17 Claims, 7 Drawing Sheets

ULTRATHIN-WALLED ROLLING BEARING

BACKGROUND OF THE INVENTION

1. Field of the Invention

The present invention relates to an ultrathin-walled rolling bearing used in industrial robots, machine tools, medical instruments, and the like, and more particularly it relates to an arrangement for stabilizing the behavior of a segment type cage of resin incorporated into an ultrathin-walled rolling bearing, so as to reduce the rubbing sound that is produced when the cage comes in contact with the bearing rings.

2. Description of the Prior Art

In FIG. 8, an example of a CT scanner device that is a kind of medical instrument is shown. In the CT scanner device, X-rays produced by an X-ray tube device 50 are applied to a subject 53 through a wedge filter 51 for uniformizing their intensity distribution and a slit 52 for restricting the intensity distribution. The X-rays passing through the subject 53 are received by a detector 54, where they are converted into an electric signal, which is then fed to an unillustrated computer. Such parts as the X-ray tube device 50, wedge filter 51, slit 52, and detector 54 are mounted on a substantially cylindrical rotary frame 57 rotatably supported on a fixed frame 56 through a bearing 55, the rotary driving of the rotary frame 57 rotating the parts around the subject 53. In the CT scanner device, the rotary motion of the mutually opposed X-ray tube device 50 and detector 54 around the subject 53 provides the projection data covering all angles in the examination cross-section of the subject 53, and a tomographic image is obtained from a reconstructed program programmed in advance from these data.

In the CT scanner device, since the inner periphery of the fixed frame 56 is formed in a size (about 1 m in general) to receive the subject 53, a bearing that is very small in cross-sectional area for its diameter, or a so-called ultrathin-walled rolling bearing is used as the bearing 55 between the fixed frame 56 and rotary frame 57.

Those ultrathin-walled rolling bearings which are frequently used in CT scanner devices have their cages made of resin. Such resin-made cage is in the form of a plurality of arcuate segments annularly joined together, wherein adjacent segments projection-recess fit together at their ends. Each segment is an injection-molded article, and fiber-reinforced polyamide resin (PA66) is generally used as a raw material therefor. The PA66 has a greater linear expansion coefficient than that of bearing steel, which is a material for raceway rings, and the PA66 has a property such that its dimensional difference increases according to temperature change or such that it expands due to its water absorption. Therefore, in the case of a large-sized bearing, the circumferential length of the cage greatly changes. With all segments joined together, the change in the circumferential length of the cage can eliminate the guide gap between the cage and the raceway rings; therefore, the cage is used with a gap G opened at one place (the non-joined state) (FIG. 10), rather than all the segments being joined together.

The prior art of this kind of ultrathin-walled rolling bearing is described, for example, in Japanese Patent applications Laid-Open under Nos. 2000-329143, 2001-304266, and 2002-81442.

Since resin-made segments constituting a cage are injection-molded articles, there are cases where the fitting in the convex-concave fit portion becomes loose due to an error in molding. Loose fitting can result in a dislocation occurring between adjacent segments 410 and 420, as shown in FIG. 9, which illustrates a case where the right-hand side segment 420 is dislocated radially inward.

The cage 400 of the ultrathin-walled rolling bearing is used generally with a raceway ring guide; in FIG. 9, a case of an outer ring guide is illustrated. The raceway ring-guided cage is radially guided (centered)by the cage guide surface of the raceway ring (either the outer ring inner diameter surface or the inner ring outer diameter surface) and is adapted to properly maintain the radial clearance between the cage guide surface of the raceway ring and the cage outer diameter surface (or inner diameter surface) to prevent the whirling of the cage. And, with the rotation of the bearing, the cage rotates by receiving driving power from the outer ring 100, inner ring 200 or rolling elements 300 depending on the guide system while radially moving within the range of the guide clearance S in the cage indicated by S in FIG. 9. Therefore, in the case of the outer ring-guided cage, for example, when a dislocation occurs in the segment 420, as shown in FIG. 9, with the rotation of the cage 400 the end 421 of the segment 420 contacts the outer periphery of the inner ring 200, which it should ordinarily do not contact, (hereinafter referred to as "abnormal contact"), which sometimes forms a factor of abnormal sounds, such as tapping sound and vibroacoustics.

Further, the lead and delay of the rolling elements take place depending on the internal clearance of the bearing and the service conditions. If, as in the prior art, the cage is used with a gap G opened at one place in the cage (the non-joined state) (FIG. 10), rather than all the segments being joined together, the lead and delay of the rolling elements make the behavior of the cage unstabilized, thus easily leading to the rubbing sound that occurs when the cage contacts the raceway, or the tapping sound that occurs when the segment in the non-joined region taps the raceway rings. Such rubbing sound becomes a problem in the bearings used in CT scanners or the like required to rotate at high speed and quietly.

SUMMARY OF THE INVENTION

An object of the present invention is to prevent or inhibit the production of such abnormal sounds as in the case of an ultrathin-walled rolling bearing.

According to an embodiment of the invention, an ultrathin-walled rolling bearing comprises an inner ring, an outer ring, a plurality of rolling elements interposed between the raceway surfaces of the inner and outer rings, and a cage annularly formed by circumferentially joining a plurality of segments each having pockets for storing the rolling elements, the ratio of the diameter of the rolling elements to the pitch circle diameter being not more than 0.03, the cage is made of a resin material that satisfies either or both of the conditions (a) that the ratio of its linear expansion coefficient to that of bearing steel is not less than 1 but not more than 2 and (b) that its water absorption percentage is 0–0.5%.

Employing such arrangement causes the segments to hardly expand or contract, thus making it possible to form an annular integral cage. As a result, the behavior of the cage becomes stabilized and abnormal sound is prevented or inhibited. Whereas it has heretofore been necessary to provide the non-joined portion because of the use of PA66 as the material of the cage, it has become possible to use an annular integral cage by selecting a hardly expansible/contractible material (in which the ratio of its linear expansion coefficient to that of steel is small and which hardly absorbs water). By eliminating the non-joined portion of the segment and making the cage in annular integral form, it is possible to stabilize the behavior of the cage even if the lead or delay of the rolling elements take place. This abates the tapping sound or rubbing sound on the segments.

A slit may be formed in a column portion between adjacent pockets of the cage. The provision of slits makes it easier for the columns to be elastically deformed, so that less force for inserting the balls (ball inserting force) is required, facilitating the ball incorporating operation. For example, in setting the slits, it is possible to make the ball inserting force not more than 3 kgf per pocket.

Ball restraining pockets and ball non-restraining pockets may be alternatively formed in the cage, the inlet diameter of the ball restraining pockets being 90–98% of the ball diameter. This or the synergistic effect of this and the feature of slits as above improves the ball incorporatability.

The cage may be a ball-guiding crowned cage for holding the balls by spherical pockets and may be of stepped cross-sectional construction. Such ball-guiding cage is capable of stabilizing the behavior of the cage even if the lead and delay of the balls take place, thereby preventing or inhibiting the rubbing sound that is produced when the cage contacts the raceway ring.

The cage may be such one that satisfies the conditions that 0.4DB<H<0.6DB and that h<0.8 H, where DB is the ball diameter, H is the height of the cross section of the cage, and h is the step in a cage column portion.

According to another embodiment of the invention, an ultrathin-walled rolling bearing comprises an inner ring, an outer ring, a plurality of rolling elements interposed between the raceway surfaces of the inner and outer rings, and a cage annularly formed by circumferentially joining a plurality of segments each having pockets storing the rolling elements, the ratio of the diameter of the rolling elements to the pitch circle diameter being not more than 0.03, the ultrathin-walled rolling bearing being characterized in that the cage is formed by annularly joining a plurality of arcuate segments each having pockets for storing balls, the cage being a ball-guiding crowned cage for holding the balls by spherical pockets and being of stepped cross-sectional construction.

Here, too, the cage may be such one that satisfies the conditions that 0.4DB<H<0.6DB and that h<0.8 H, where DB is the ball diameter, H is the height of the cross section of the cage, and h is the step in a cage column portion.

Embodiments of the invention will now be described in more detail with reference to the drawings.

DESCRIPTION OF THE PREFERRED EMBODIMENTS

Figure 1:
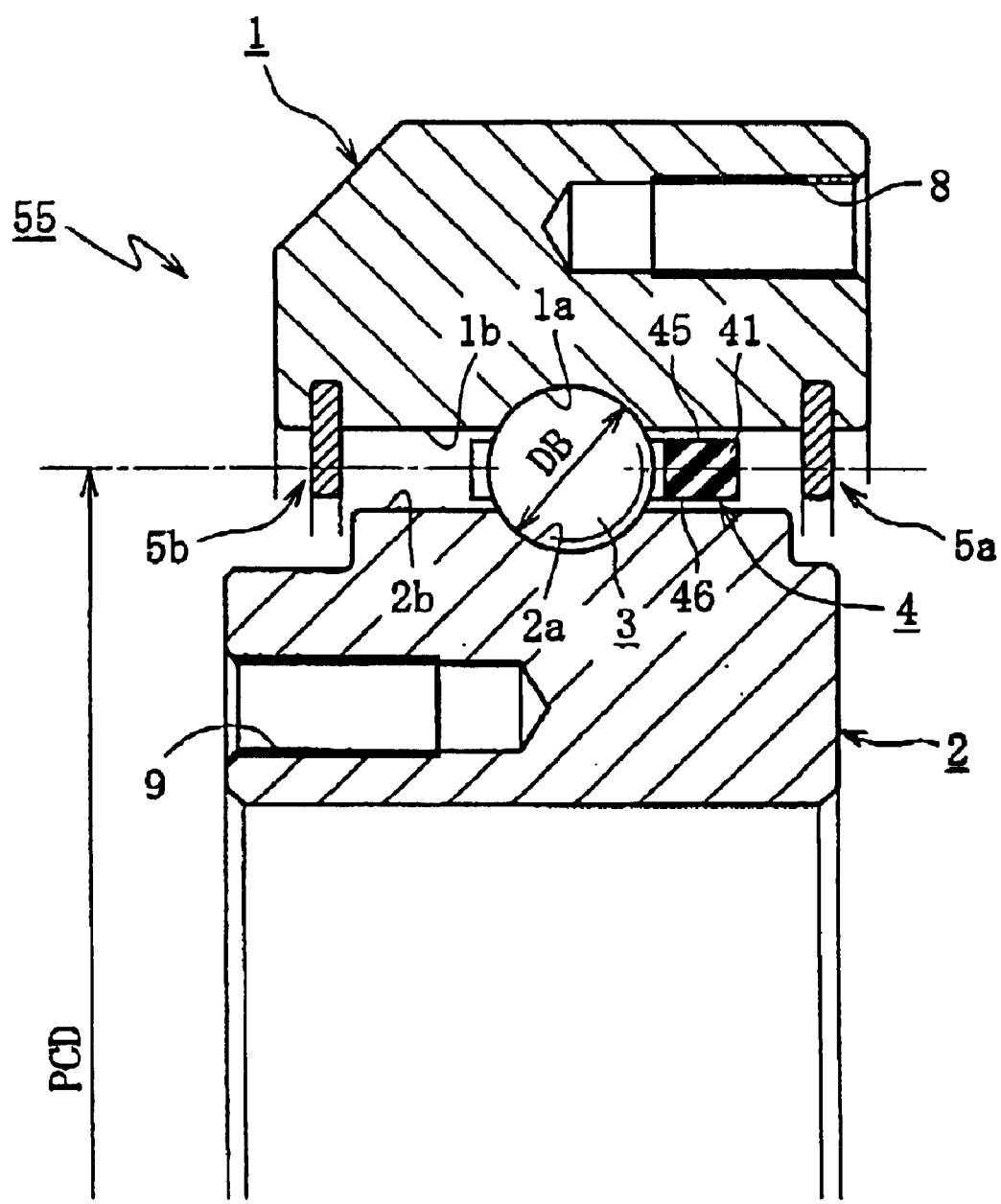
FIG. 1 is a sectional view of an ultrathin-walled rolling bearing showing an embodiment of the invention.

FIG. 1 shows the cross-sectional construction of a ultrathin-walled rolling bearing 55 used in CT scanner devices. This bearing 55 comprises an annular outer ring 1, an annular inner ring 2 disposed concentrically on the inner peripheral side of the outer ring 1, and rolling elements, or balls 3 in this case, rollably interposed between the raceway surface 1a of the outer ring 1 and the raceway surface 2a of the inner ring 2, a cage 4 for holding the balls 3 at circumferentially equispaced intervals, and seals 5a and 5b for sealing the openings at the opposite ends of the bearing.

In the drawings, balls are illustrated as the rolling elements 3, but rollers maybe used. And, a single row rolling bearing having a single row of rolling elements 3 is shown, but the invention is not limited thereto, and a double row rolling bearing having two rows of rolling elements may be used.

This bearing is an ultrathin-walled rolling bearing in which the pitch circle diameter PCD is about 500 mm–1500 mm and in which the ratio φ of the diameter DB of the balls 3 to the pitch circle diameter PCD is not more than 0.03; for example, in the case where the ball diameter is ½ inch (12.7 mm) and the pitch circle diameter PCD is 1041.4 mm, the ratio φ between the two is 0.012.

Figure 8:
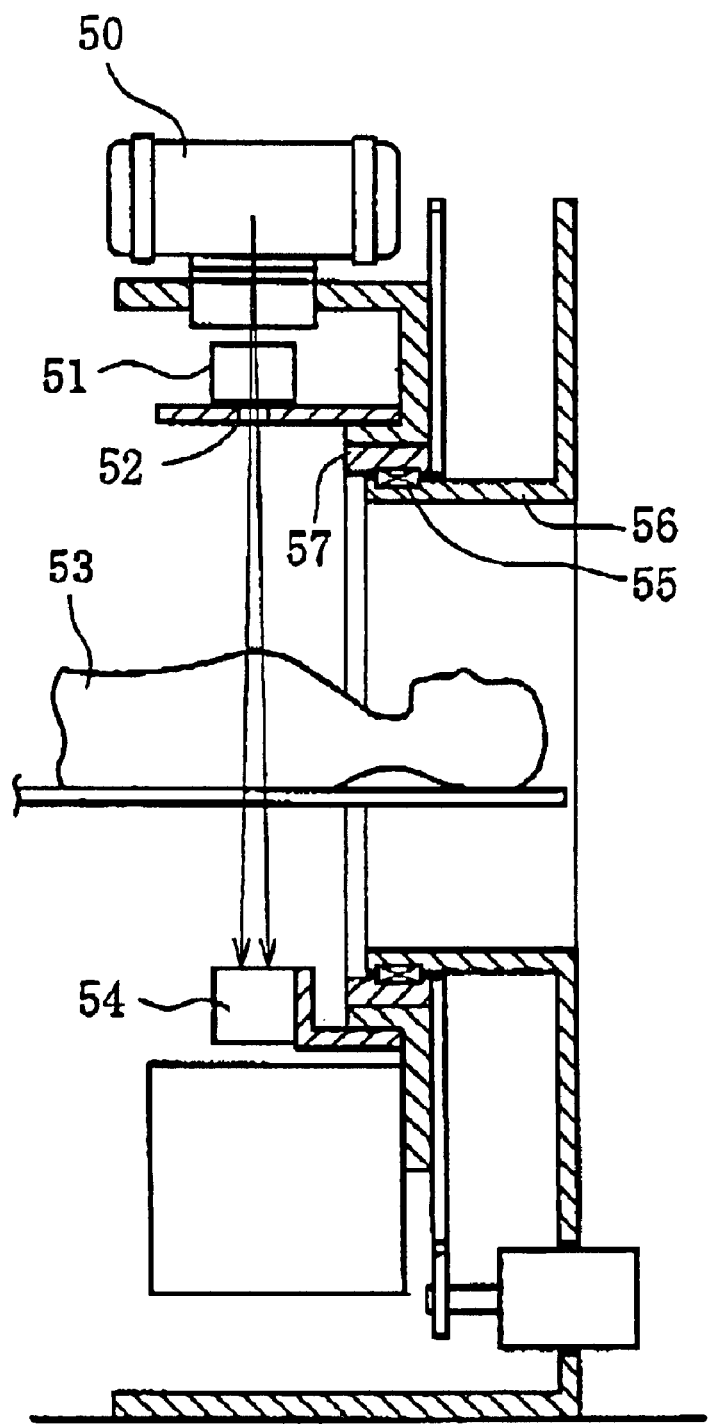
FIG. 8 is sectional view schematically showing the construction of a CT scanner device.
Figure 9:
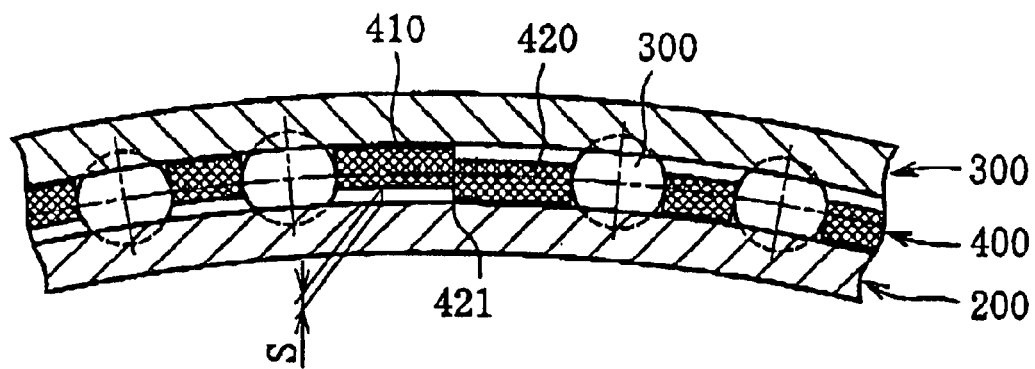
FIG. 9 is a sectional view showing a dislocation taking place in the. fit region between segments.

Attaching holes 8 are formed in one end surface of the outer ring 1, into which unillustrated fastening means, such as bolts, are screwed, whereby the outer ring 1 is fixed to the rotary frame 57 of the CT scanner device shown in FIG. 8. Attaching holes 9 are also formed in the inner ring 2, into which unillustrated fastening means, such as bolts, are screwed, whereby the inner ring 2 is fixed to the fixed frame 56. Thus, it is seen that the outer ring 1 constitutes a rotary member that rotates with the rotary frame 57 and that the inner ring 2 constitutes a nonrotatable fixed member. Depending upon the construction of the CT scanner device, in a manner reverse to the above, the outer ring 1 may be made to serve as the nonrotatable fixed side and the inner ring 2 as the rotary side rotating with the rotary frame 57.

Figure 2:
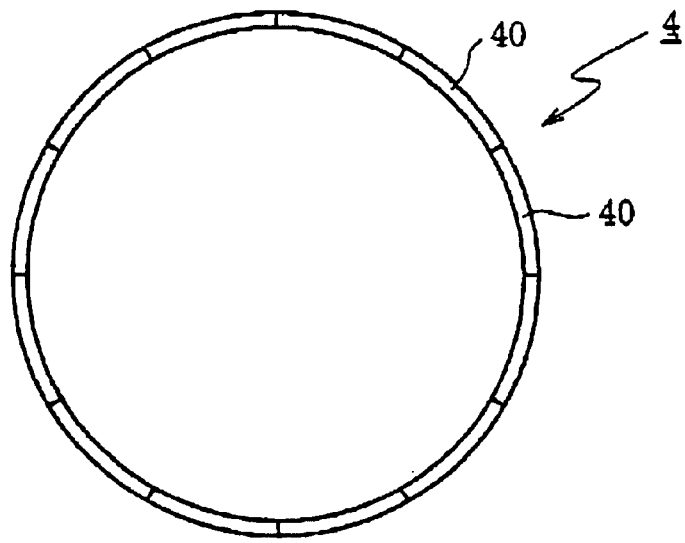
FIG. 2 is a front view schematically showing the construction of a cage.
Figure 3:
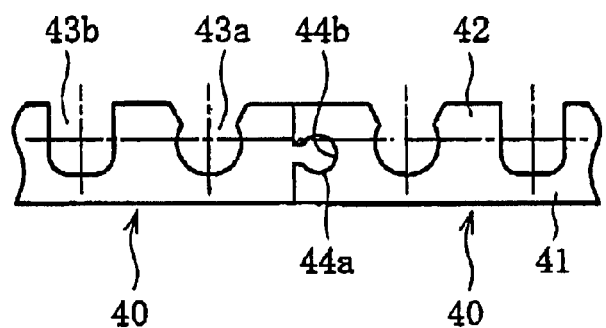
FIG. 3 is a partial plan view showing the fit region between segments.
Figure 4:
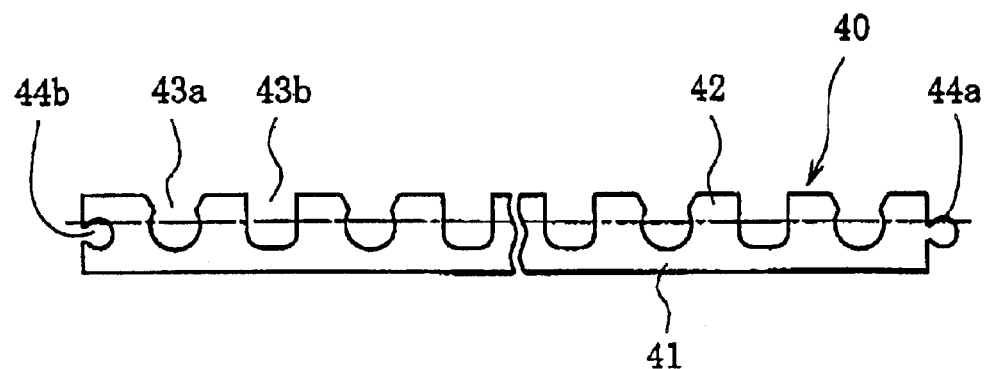
FIG. 4 is a developed plan view of segments.

The cage 4 is of a segment type in which, as shown in FIG. 2, a plurality of arcuate segments 40 are circumferentially connected together in annular form. Each segment 40 is formed by injection-molding a resin material. As shown in FIGS. 3 and 4, convex or concave fit portions 44a or 44b formed in the opposite ends of each segment 40 are fitted to concave or convex fit portions 44b or 44a formed in a mating segment end for circumferential engagement with each other, whereby adjacent segments 40 are joined, forming an annular cage 4. In addition, FIGS. 3 and 4 show an arcuate segment developed linearly.

Figure 5A:
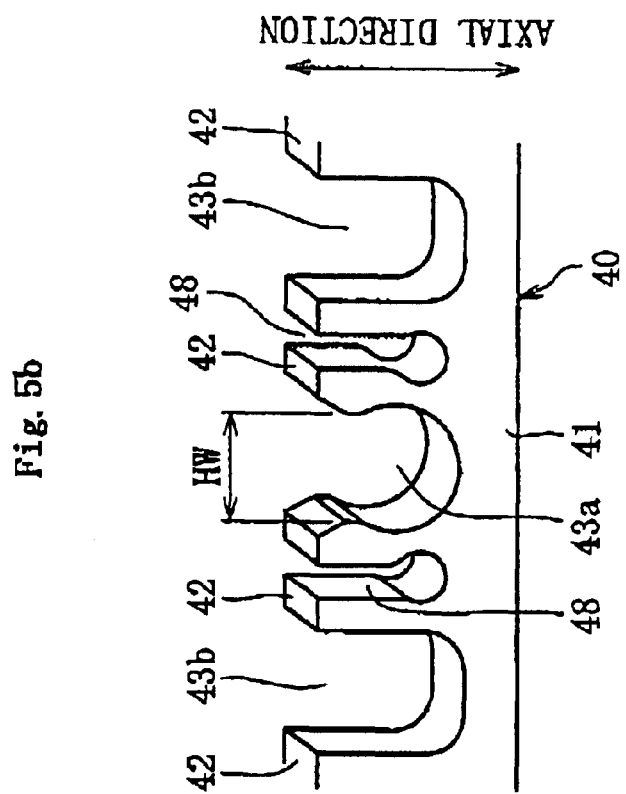
FIG. 5a is an enlarged perspective view of a slitless segment.

The segment 40 shown by way of example in FIGS. 3 and 4 comprises an arcuate base portion 41 obtained by dividing an annulus at a plurality of circumferential places, and column portions 42 extending from the base portion 41 in one axial direction, with pockets (43a, 43b) formed between adjacent column portions 42. There are two kinds of pockets (43a, 43b): first pockets 43a having the function of retaining the balls 3 and the function of equispacing the balls 3, and second pockets 43b having only the function of equispacing the balls 3. The first pockets 43a each have their pocket opening width HW (see FIG. 5 (a)) made smaller than the diameter DB of the balls 3 to prevent the balls 3 from popping out toward the pocket opening side, so that the balls 3 are retained in the first pocket 43a. The second pocket 43b each have their pocket opening width made larger than the diameter of the balls 3 to allow free axial movement of the balls 3. Thus, the second pockets 43b do not have the retaining function as do the first pockets 43a but have only the function of equispacing the balls 3. Each segment 40 has these two kinds of pockets 43a and 43b alternately circumferentially formed.

The purpose of the provision of two kinds of pockets, the first pockets 43a having the ball retaining capability and the second pockets 43b not having the ball retaining capability is to alternately arrange the pockets that restrain the balls, from the standpoint of incorporatability. Specifically, let DB be the diameter of the balls 3 and HW be the ball inlet diameter, then the relation HW=0.90DB–0.98DB is suitable. If the interference for the ball restraining pockets is too large, ball insertion becomes difficult, and, reversely, if it is too small, the balls will fall off due to chock or the like. Therefore, the interference is set at an optimum interference allowing easy ball insertion and preventing the falling-off of the balls. In addition, if the HW is too large, the play of the balls axially of the cage becomes excessive, which is disadvantageous from the standpoint of vibration and sound produced during operation; therefore, a more preferable setting is HW=0.90–0.94DW.

The incorporation of the balls 3 into the pockets 43a and 43b is effected by pushing the balls 3 into the innermost regions of the pockets 43a and 43b through their openings. At this time, it is necessary to push the balls 3 into the first pockets 43a while spreading the column portions 42 on the inlet side, whereas it is unnecessary to take such trouble for the second pockets 43b, so that the step of incorporating the rolling elements 3 into the cage 4 can be facilitated. In addition, the shape and construction of the pockets 43a and 43b described above are shown only for the sake of example, and various shapes, for example, single shape for pockets, and constructions for the pockets may be employed according to the service conditions and the like for the bearing.

Both of the first and second pockets 43a and 43b have a pocket clearance between the surface of the ball 3 and the inner surface of the pocket (pocket surface) 47, and the presence of the pocket clearances cause the cage 4 to radially move during the rotation of the bearing. With this movement, the cage 4 contacts either the outer peripheral surface 2b of the inner ring 2 or the inner peripheral surface 1b of the outer ring 1, whereby the cage 4 is guided for rotation. In the embodiment shown in FIG. 1, the cage 4 of the outer ring-guided type is shown by way of example in which the cage 4 is guided for rotation with the outer periphery 45 of the cage contacted with the inner periphery 1b of the outer ring. In this outer ring-guided system, the bearing is so designed that the inner periphery 46 of the cage is out of contact with the outer periphery 2b of the inner ring 2.

Figure 10:
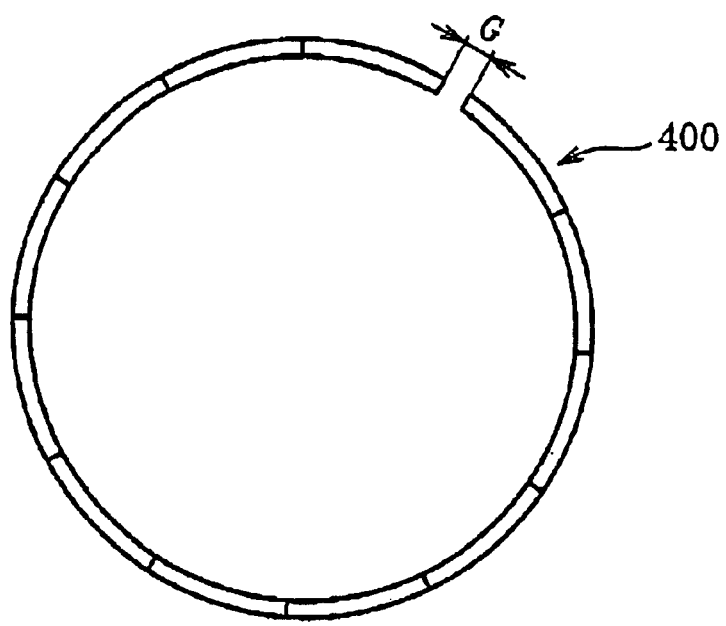
FIG. 10 is affront view of a conventional segment type cage.

As described in connection with FIG. 10, conventionally, in a large-sized rolling bearing cage composed of a plurality of arcuate segments, there has been a non-joined gap G in one circumferential place. The purpose of setting this gap G has been to adjust the circumferential length pf the cage that expands and contracts due to a change in temperature or water absorption percentage. Therefore, it follows that if a material that hardly expands or contract is used for segments constituting a cage, the annular integral type having no gap (non-joined portion) can be employed.

Thus, the result of investigation of various resin materials is shown in Table 1. In this table 1, interference with the raceway due to expansion and contraction in the right-hand side column is the result from confirmation with the ultrathin-walled bearing series articles produced by NTN Co., Ltd. For example, in the case of a bearing having a pitch circle diameter PCD of 1000 mm and a guide gap of 1 mm in diameter between the outer ring and the cage, the cage being made of PA66 (nylon 66) and when it is supposed that the surrounding temperature changes from 20° C. to 60° C. and that the water absorption percentage of the cage changes from 2% to 3%, the cage will interfere with the raceway ring when the guide gap is –2.3 mm and when the following influences are taken into consideration.

Influence of temperature change=(4.5–1.25)×10$^{-5}$×1000× ΔT(60–20)=1.3 mm

Influence of cage expansion on water absorption=0.1% (that is a percentage change in dimension when the water absorption percentage increases by 1%)×1000=1 mm (if this value is not more than 5 mm, the balls are stabilized, causing no problem with sound).

TABLE 1

Result of Investigation of Resin Materials

| Material | Linear expansion coefficient (/° C.) × 10$^{-5}$ | Linear expansion coefficient ratio | Water absorption percentage (%) | Interference with raceway due to expansion and contraction |
|---|---|---|---|---|
| Bearing steel | 1.25 | 1 | | — |
| PI (polyimide) | 1.5 | 1.2 | 0.2 | No |
| PPS (polyphenylene sulfide) | 2.2 | 1.76 | 0.02 (no absorption of water) | No |
| PA46 (nylon 46) | 3.0 | 2.4 | 3.0 | Yes |
| PA66 (nylon 66) | 3–6 mean value: 4.5) | 3.6 | 2.2 | Yes |

It is seen from this investigation result that those material which can be employed as a material that hardly expands or contracts satisfy the following conditions.

(a) The linear expansion coefficient ratio (resin/bearing steel) is not more than 2.

(b) The water absorption percentage is not more than 0.5%.

Figure 5B:
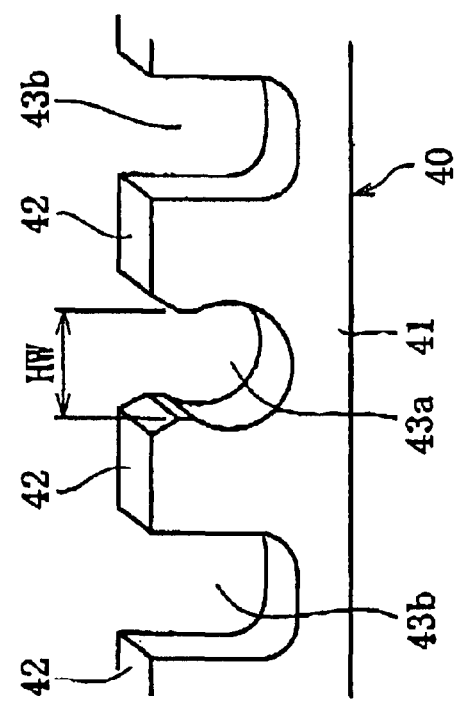
FIG. 5b is an enlarged perspective view of a slit-formed segment.

Since the use of such a material as PPS (polyphenylene sulfide) increases rigidity (Young's modulus), there are cases where incorporation of balls is difficult; therefore, it is preferable to improve the incorporatability. For example, since the provision of the slit 48 in the column 42 between adjacent pockets as shown in FIG. 5b facilitates the elastic deformation of the columns 42, it is possible to improve the incorporatability. It has been found that the incorporatability is improved by setting the slit so that the force required to insert the ball is not more than 3 kgf per pocket. Table 2 shows the result of ball insertion tests.

TABLE 2

Ball Insertion Test Result

| Cage material | Young's modulus (MPa) | Ball insertion force (kgf) |
| --- | --- | --- |
| Comparative example (PA66) | About 3000 | 0.4–0.6 |
| Embodiment 1 (without slit) | About 9000 | 6.0–7.0 |
| Embodiment 2 (with slit) | | 2.5–2.7 |

Next, an embodiment shown in FIGS. 6 and 7 will be described. In addition, FIG. 6a shows a conventional cage for comparison purposes. In this embodiment, the cage 4 is used as a ball guide, whereby the behavior of the cage 4 is stabilized irrespective of the lead or delay of the balls 3, thus preventing the production of rubbing sound that is produced when the cage contacts the raceway ring 1 or 2.

Figure 6B:
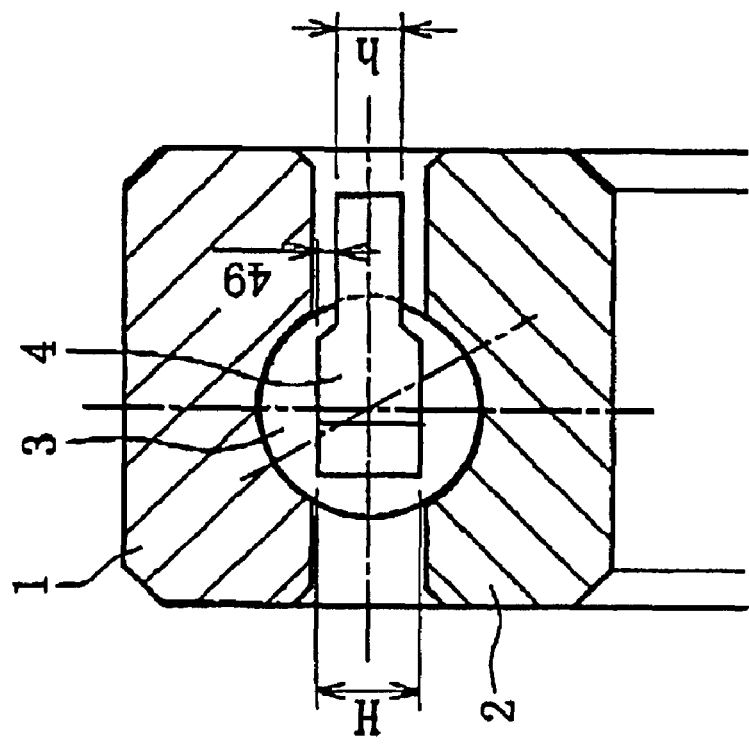
FIG. 6 is a sectional view of a bearing showing another embodiment of the invention.
Figure 6A:
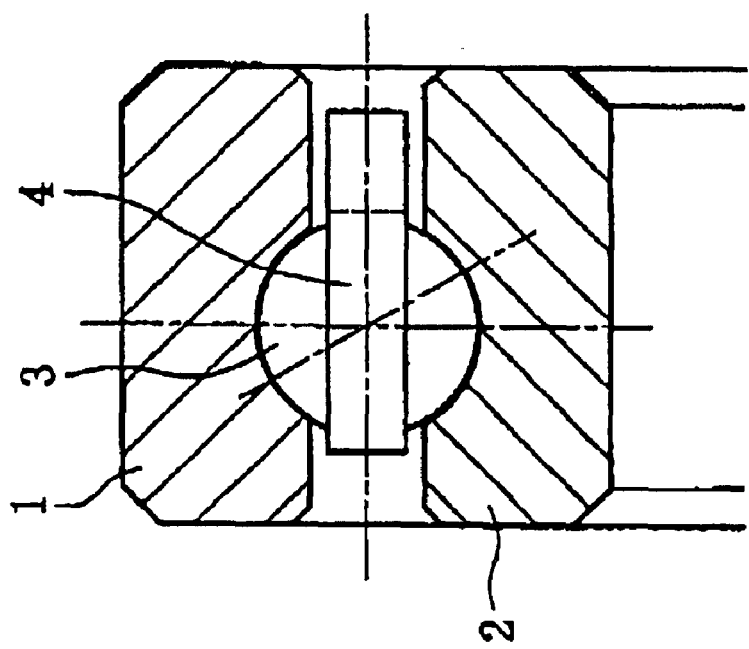
Figure 7A:
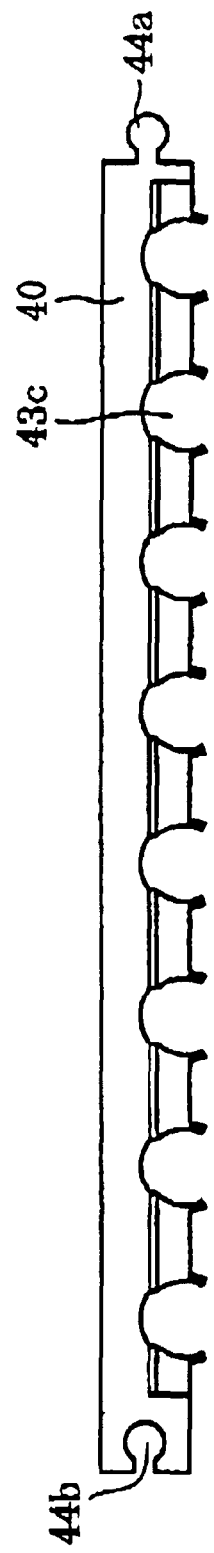
FIG. 7a is a developed plan view of the segment in FIG. 6.
Figure 7B:
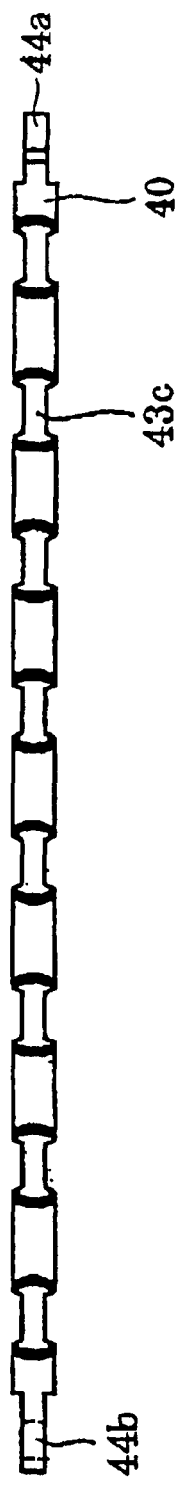
FIG. 7b is a sectional view of the segment in FIG. 6.

As can be understood from FIGS. 6b and 7, in this embodiment, a crowned cage having spherical pockets 43c is used. The crowned cage is a cage having a horn so shaped as to allow the combination of the rolling elements and the cage, the cage being assembled by being pushed into the bearing from one side. In addition, it is still of the segment type.

Further, in the embodiment shown in FIG. 6b as compared with the conventional cage shown in FIG. 6a, the cage cross-sectional height H takes a maximum value that makes it possible to axially insert the cage 4, while the cross-sectional height h of the cage column is determined by removing the material by an amount corresponding to the step difference shown at 49 with respect to the cage cross-sectional height H. Since the cage 4 has a pocket clearance, a radial play in the cage 4 with respect to the ball 3 takes place. The ball guide is established by making the step difference 49 greater than the radial play. Setting the relationship between the values of H and h to satisfy the following relation provides a ball guide cage.

$$0.4DB < H < 0.6DB$$
$$h < 0.8H$$

The employment of such crowned cage of stepped cross-sectional construction having spherical pockets established the ball guide, which makes it possible to stabilize the behavior of the cage 4 even if the lead and delay of the balls 3 take place and to cope with the rubbing sound produced by the cage contacting the raceway ring 1 or 2. In the case of this embodiment, therefore, it is believed that it is not absolutely necessary for the cage 4 to be of the annular integral type; it may have a non-joined portion G (FIG. 10).

In the above description, there has been illustrated, as shown in FIG. 1, an outer ring-guided type cage 4 adapted to be guided for rotation by through contact between the outer periphery 45 of the cage and the inner periphery 1b of the outer ring; however, the invention is not limited thereto. The invention is likewise applicable to the inner ring-guided type cage adapted to be guided for rotation of the cage 4 through contact between the inner periphery 46 of the cage and the outer periphery 2b of the inner ring, and to the rolling element-guided type cage adapted to be guided for rotation through only contact with the rolling elements 3.

According to the invention, since the behavior of the cage is stabilized, it can be expected to reduce the rubbing sound or other abnormal sounds that are produced when the cage contacts the raceway ring.

What is claimed is:

1. A rolling bearing comprising an inner ring, an outer ring, a plurality of rolling elements interposed between the raceway surfaces of the inner and outer rings, and a cage annularly formed by circumferentially joining a plurality of segments each having pockets for storing the rolling elements, the ratio of the diameter of the rolling elements to the pitch circle diameter being not more than 0.03, said rolling bearing being characterized in that said cage is made of a resin material in which the ratio of its linear expansion coefficient to that of bearing steel is 1–2.

2. A rolling bearing as set forth in claim 1, characterized in that a slit is formed in a column portion between adjacent pockets of said cage.

3. A rolling bearing as set forth in claim 1, characterized in that ball restraining pockets and ball non-restraining pockets are alternatively formed in said cage, the inlet diameter of the ball restraining pockets being 90–98% of the ball diameter.

4. A rolling bearing as set forth in claim 1, characterized in that said cage is a ball-guiding crowned cage for holding the balls by spherical pockets and is of stepped cross-sectional construction.

5. A rolling bearing set forth in claim 4, characterized in that said cage satisfies the conditions that $0.4DB < H < 0.6DB$ and that $h < 0.8H$, where DB is the ball diameter, H is the height of the cross section of the cage, and h is the step in a cage column portion.

6. A rolling bearing comprising an inner ring, an outer ring, a plurality of rolling elements interposed between the raceway surfaces of the inner and outer rings, and a cage annularly formed by circumferentially joining a plurality of segments each having pockets for storing the rolling elements, the ratio of the diameter of the rolling elements to the pitch circle diameter being not more than 0.03, said rolling bearing being characterized in that said cage is made of a resin material whose water absorption percentage is not more than 0.5%.

7. A rolling bearing as set forth in claim 6, characterized in that a slit is formed in a column portion between adjacent pockets of said cage.

8. A rolling bearing as set forth in claim 6, characterized in that ball restraining pockets and ball non-restraining pockets are alternatively formed in said cage, the inlet diameter of the ball restraining pockets being 90–98% of the ball diameter.

9. A rolling bearing as set forth in claim 6, characterized in that said cage is a ball-guiding crowned cage for holding the balls by spherical pockets and is of stepped cross-sectional construction.

10. A rolling bearing as set forth in claim 9, characterized in that said cage satisfies the conditions that $0.4DB < H < 0.6DB$ and that $h < 0.8H$, where DB is the ball diameter, H is the height of the cross section of the cage, and h is the step in a cage column portion.

11. A rolling bearing comprising an inner ring, an outer ring, a plurality of rolling elements interposed between the raceway surfaces of the inner and outer rings, and a cage annularly formed by circumferentially joining a plurality of segments each having pockets for storing the rolling elements, the ratio of the diameter of the rolling elements to the pitch circle diameter being not more than 0.03, said rolling bearing being characterized in that said cage is made of a resin material in which the ratio of its linear expansion coefficient to that of bearing steel is 1–2 and that has a water absorption percentage of not more than 0.5%.

12. A rolling bearing as set forth in claim 11, characterized in that a slit is formed in a column portion between adjacent pockets of said cage.

13. A rolling bearing as set forth in claim 11, characterized in that ball restraining pockets and ball non-restraining pockets are alternatively formed in said cage, the inlet diameter of the ball restraining pockets being 90–98% of the ball diameter.

14. A rolling bearing as set forth in claim 11, characterized in that said cage is a ball-guiding crowned cage for holding the balls by spherical pockets and is of stepped cross-sectional construction.

15. A rolling bearing as set forth in claim 14, characterized in that said cage satisfies the conditions that 0.4DB <H <0.6DB and that h <0.8 H, where DB is the ball diameter, H is the height of the cross section of the cage, and h is the step in a cage column portion.

16. A rolling bearing comprising an inner ring, an outer ring, a plurality of rolling elements interposed between the raceway surfaces of the inner and outer rings, and a cage annularly formed by circumferentially joining a plurality of segments each having pockets for storing the rolling elements, the ratio of the diameter of the rolling elements to the pitch circle diameter being not more than 0.03, said rolling bearing being characterized in that said cage is formed by annularly joining a plurality of arcuate segments each having pockets for storing balls, said cage being a ball-guiding crowned cage for holding the balls by spherical pockets and being of stepped cross-sectional construction.

17. A rolling bearing as set forth in claim 16, characterized in that said cage satisfies the conditions that 0.4DB <H <0.6DB and that h <0.8 H, where DB is the ball diameter, H is the height of the cross section of the cage, and h is the step in a cage column portion.

* * * * *